Figure 1:
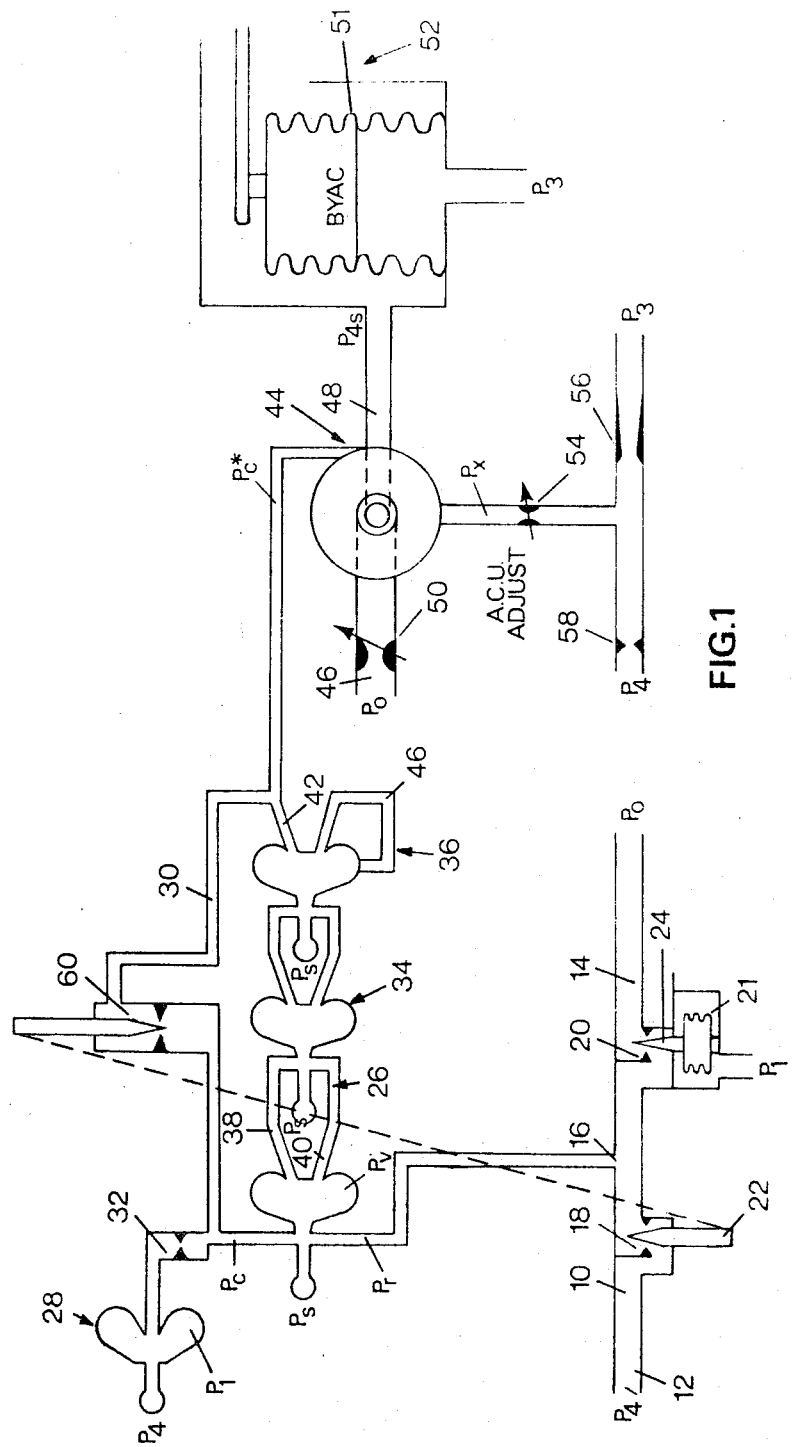

United States Patent [19]
Cantwell

[11] 3,783,903
[45] Jan. 8, 1974

[54] FLUIDIC PRESSURE RATIO CONTROL

[75] Inventor: Hugh Francis Cantwell, Derby, England

[73] Assignee: The Secretary of State for Defense in Her Britannic Majesty's Government of the United Kingdom of Great Britain and Northern Ireland, London, England

[22] Filed: June 7, 1971

[21] Appl. No.: 150,705

[30] Foreign Application Priority Data
June 16, 1970 Great Britain.................. 29,003/70

[52] U.S. Cl. ........................... 137/805, 60/39.28 R
[51] Int. Cl. .............................................. F15c 1/12
[58] Field of Search ................................. 137/81.5; 60/39.28 R

[56] References Cited
UNITED STATES PATENTS

| | | | |
|---|---|---|---|
| 3,308,618 | 3/1967 | Jubb et al. ...................... | 60/39.28 R |
| 3,392,739 | 7/1968 | Taplin et al. .................... | 60/39.28 R |
| 3,394,721 | 7/1968 | Ifield .............................. | 60/39.28 R |
| 3,417,772 | 12/1968 | Schaeffer ......................... | 137/81.5 |
| 3,633,603 | 1/1972 | Furlong et al. ..................... | 137/81.5 |
| 3,461,892 | 8/1969 | Boothe et al. .................. | 137/81.5 X |
| 3,537,466 | 11/1970 | Chapin............................ | 137/81.5 |
| 3,564,844 | 2/1971 | Rimmer ......................... | 137/81.5 X |
| 3,592,213 | 7/1971 | Smith............................. | 137/81.5 X |
| 3,613,369 | 10/1971 | Colston......................... | 137/81.5 X |
| 3,621,655 | 11/1971 | Hawes........................... | 137/81.5 X |
| 3,636,964 | 1/1972 | Colamussi et al.............. | 137/81.5 X |
| 3,643,428 | 2/1972 | Marshall et al. ............... | 137/81.5 X |
| 3,654,945 | 4/1972 | Soviche et al. .................... | 137/81.5 |
| 3,645,094 | 2/1972 | Suggs............................ | 137/81.5 X |

Primary Examiner—Samuel Scott
Attorney—Cushman, Darby & Cushman

[57] ABSTRACT

This invention relates to a fluidic apparatus for controlling the ratio between two variables, namely, the inlet and outlet pressures of the compressor of a gas turbine engine, through the use of error detectors, sensing means and amplifier means all for the purpose of producing a control pressure for the fluidic means, which also incorporates feedback means in one of its stages.

11 Claims, 2 Drawing Figures

FLUIDIC PRESSURE RATIO CONTROL

This invention relates to apparatus for controlling the ratio between two variables, e.g. the ratio between the inlet and outlet pressures of the compressor of a gas turbine engine, though the invention may equally well be applied to the control of the ratio between other variables.

Various forms of apparatus for controlling the compressor pressure ratio are known and fall into two groups, mechanical and electronic systems. Both of these systems suffer from one or more of the following disadvantages, excessive weight, cost and inaccuracy over an engine operating range.

The present invention seeks to provide a control apparatus which will at least tend to overcome some of the above disadvantages.

The present invention provides a fluidic circuit for controlling the ratio between two variables, the circuit comprising fluidic sensing means for detecting any error in said ratio, a first fluidic sensing means arranged to amplify any such error to produce a control pressure, the first fluidic amplifying means having a variable feedback of the control pressure to the sensing means, the variation of the feedback pressure being dependant on the values of the variables, a second fluidic amplifying means having a variable power supply pressure dependant on one of said variables, an output pressure arranged to vary a control system upon which the values of the variables depends and a control signal which is the control signal generated by the first fluidic amplifying means, the second fluidic amplifying means being capable of operation in two modes, one in which the power supply pressure is greater than the control pressure and the output signal is a function of the power supply pressure and the other in which the control pressure is greater than the power supply pressure and the output pressure is a function of the control pressure.

The fluidic sensing means may comprise a reference pressure and a control pressure, both of said pressures acting as control pressures for the first fluidic amplifying means.

The reference pressure may be obtained from a splitter, one of the variables being supplied to the splitter in the form of a variable pressure arranged to pass through a first manually controlled variable area orifice, the splitter being vented to ambient pressure via a second variable area orifice.

The control pressure for the first fluidic amplifying means may be obtained from a jet collector which is supplied with both of said variables in the form of variable pressures, the output from the jet collector passing through a fixed area orifice.

The feedback may be connected to the control pressure generated by the jet collector downstream of the fixed area orifice.

The feedback may incorporate a variable area orifice the size of which is a function of the first manually controlled variable area orifice in the splitter The power supply pressure for the second fluidic amplifying means may be obtained from a splitter which is supplied with one of said variables in the form of a variable pressure via a fixed area orifice and is vented to a lower pressure through a fixed orifice, the pressure supply to the amplifying means being via a variable area orifice.

The second amplifying means may also include a vent to ambient pressure via a variable area orifice in order to prevent the output pressure of the amplifying means from dropping below ambient pressure.

The first fluidic amplifying means may comprise two or more fluidic proportional amplifiers arranged in series and the second fluidic amplifying means may comprise a vortex amplifier.

The control system upon which the values of the variables depend may comprise a fuel system of a gas turbine engine.

The present invention also provides a gas turbine engine including a fluidic circuit as provided above.

Figure 2:
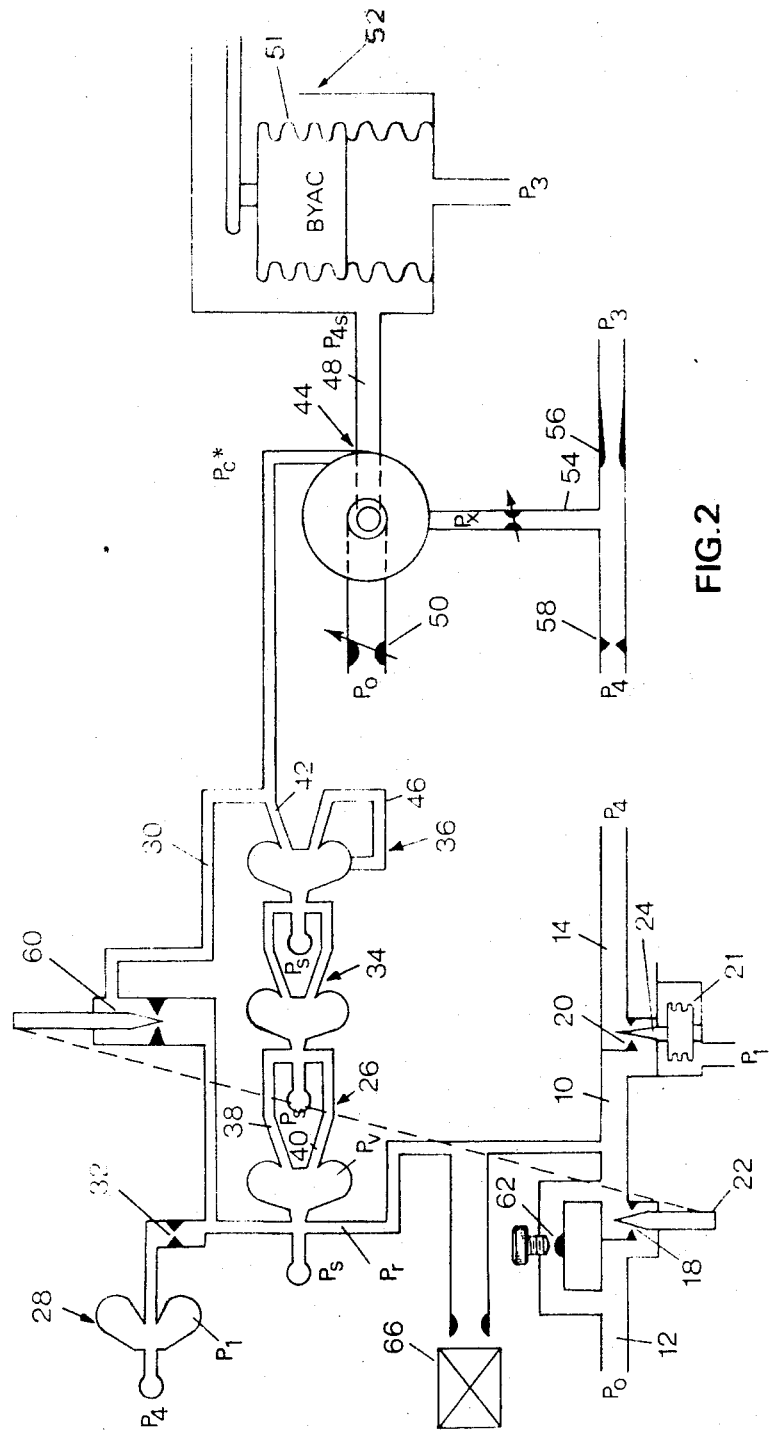

The present invention will now be more particularly described with reference to the accompanying drawings in which, FIG. 1 shows a diagrammatic layout of one form of apparatus according to the present invention for controlling the ratio between two variables and FIG. 2 shows a modified form of the apparatus shown in FIG. 1.

Referring to FIG. 1, The control apparatus consists of a number of fluidic elements which are arranged in a fluidic circuit to control the ratio between the inlet and outlet pressures of the compressor of a gas turbine engine. For the sake of convenience a list of symbols for the various pressures which are employed in the fluidic circuit are set out below:

P0 — ambient pressure
P1 — engine inlet to total pressure
P3 — compressor inlet pressure
P4 — compressor outlet pressure
P4s — capsule chamber pressure
Px — vortex amplifier supply pressure
Pc* — vortex amplifier control pressure
PR — reference pressure
PS — supply pressure
Pc — jet collector output pressure
Pv — vent pressure
a1 — feedback orifice area The circuit comprises a splitter arrangement which has a duct 10, two inlets 12 and 14 and an outlet 16. A P4 supply is passed to the outlet 16 via the inlet and a variable orifice 18 and a P0 supply is also fed to the outlet via a variable orifice 20. The size of the orifice 18 is controlled by the pilot's lever 22 and the size of the orifice 20 is controlled by P1, acting on an evacuated bellows 21 to which a closure member 24 for the orifice 20 is attached.

The output from the splitter arrangement provides a reference pressure PR which constitutes one of the control pressures of a proportional amplifier 26. The other control pressure Pc, for the amplifier 26 is obtained from the output of a jet collector 28 and a feedback loop 30. The pressures P4 and P1 are supplied to the jet collector and the output from the collector is passed through a fixed area orifice 32.

The amplifier 26 is provided with a power supply Ps and is connected in series with two further proportional amplifiers 34 and 36 which are also powered by Ps. The two outputs 38 and 40 of the amplifier 26 provide the control inputs of the amplifier 34 and the output 42 of the amplifier 36 is passed to a vortex amplifier 44 and the amplifier feedback loop 30. The remaining output 46 of the amplifier 36 is vented as are the other proportional amplifiers 26 and 34 through appropriate orifices (not shown).

The vortex amplifier 44 has a power supply pressure $Px$, a control pressure $Pc^*$ which is the output from the proportional amplifier 36 and two independent outputs 46 and 48. The output 46 is vented to ambient pressure $P0$ via a variable orifice 50 and the output 48 supplies a pressure $P4s$ which is applied to a capsule 51 of a known fuel control system 52 only a part of which is shown. The supply pressure $Px$ is obtained via a variable orifice 54 and a split between pressures $P3$ and $P4$ which are both dropped through fixed orifices, the pressure $P3$ through an orifice 56 and the pressure $P4$ through an orifice 58.

When the fuel control system 52 is operated to act as an acceleration control, the fluidic circuit is such that the vortex amplifier 44 is in the non-vortexing state and $P4s \approx 0.9Px$. and this condition is achieved when $Pc^* < Px$. The remainder of the circuit is arranged to increase $Pc^*$. as the required $P4/P1$ ratio is approached. When $Pc^*$ progressively increases above $Px$, the amplifier is in the vortexing state and $P4s$ is progressively reduced under the action of the increasing vortex strength. The reduction in $P4s$ is arranged to reduce the fuel flow by means of the known fuel control system 52. A limit to the reduction of $P4s$ is provided by means of the variable orifice 50 which vents to $P0$ and this creates a deceleration limit for the engine.

The variation of the control signal $Pc^*$ for the vortex amplifier 44 is obtained by means of the jet collector 28, the reference pressure $PR$ and the three in series proportional amplifiers 26, 34 and 36. The pressure $PR$ is compared with the output $Pc$ of the jet collector and any error is amplified to give $Pc^*$. The feedback 30 from the pressure $Pc^*$ is fed back to the control of the amplifier 26 via a variable orifice 60 which is adjusted by the pilots lever 22. The area of the orifice 60 is arranged to vary the gain of the proportional amplifiers and hence the loop gain with the $P4/P1$ level and the variation of the orifice area with pilots lever position is such that as the ratio $P4/P1$ increases the area 'a', of the variable orifice 60 increases.

FIG. 2 shows a modification to the fluidic circuit shown in FIG. 1 in which that part of the circuit which provides the reference pressure $PR$ is modified. The $P4$ supply passes through the orifice 20 whose area is varied by $P1$, and the orifice 18 through which $P0$ passes is varied by the pilots lever 22. This part of the circuit produces the same characteristic as the corresponding part of the circuit shown in FIG. 1 but has the advantage that profiles of the variable orifices are easier to manufacture.

A means of adjusting the ground idling speed is also shown and comprises a variable area orifice 62 in parallel with the variable area orifice 18. Also shown is a means for providing a low ground idling setting which comprises an orifice 64 which is controlled by a solenoid 66.

What we claim is:

1. A fluid control circuit in a gas turbine having a compressor for controlling the ratio between inlet and outlet pressure of the compressor, both of said pressures being variable, the circuit comprising a fluidic sensing means for detecting any error in said ratio, a first fluidic amplifying means arranged to amplify any such error to produce a control pressure, said fluidic sensing means including a reference pressure and a control pressure both of said pressures acting as control pressures for the first fluidic amplifying means, said reference pressure being obtained from a splitter, one of said variable pressures being supplied to one side of the splitter in the form of a variable pressure and arranged to pass through a first manually controlled variable area orifice, the other side of the splitter being vented to ambient pressure through a second variable area orifice, the first fluidic amplifying means having a variable feedback of the control pressure to the sensing means, the variation of the feedback pressure being dependent on the values of the variables, a second fluidic amplifying means having a variable power supply pressure dependent on one of said variables, an output pressure arranged to vary a control system upon which the values of the variables depend and a control signal which is the control signal generated by the first fluidic amplifying means, the second fluidic amplifying means being capable of operation in two modes, one in which the power supply pressure is greater than the control pressure and the output pressure is a function of the power supply pressure and the other in which the control pressure is greater than the power supply pressure and the output pressure is a function of the control pressure.

2. A circuit as claimed in claim 1 in which a variable area orifice is located in the feedback, the area of which is controlled as a function of, the first manually controlled variable area orifice in the splitter.

3. A circuit as claimed in claim 1 in which the splitter includes a further variable area orifice in parallel with the first manually controlled variable area orifice.

4. A circuit as claimed in claim 1 in which the power supply pressure to the second fluidic amplifying means is obtained from a splitter which is supplied with one of said variables in the form of a variable pressure via a fixed area orifice and is vented at the other side to a low pressure through a fixed orifice, the pressure supply to the amplifying means being through a variable area orifice.

5. A circuit as claimed in claim 1 in which the second fluid amplifying means also includes a vent via a variable area orifice to ambient pressure.

6. A circuit as claimed in claim 1 in which the first fluidic amplifying means comprises two or more proportional amplifiers arranged in series.

7. A circuit as claimed in claim 1 in which the second fluidic amplifying means comprises a vortex amplifier.

8. A circuit as claimed in claim 1 in which the control system upon which the values of the variables depend, comprises a fuel control system of a gas turbine engine.

9. A fluid control circuit in a gas turbine having a compressor for controlling the ratio between inlet and outlet pressure of the compressor, both of said pressures being variable, the circuit comprising fluidic sensing means for detecting any error in said ratio, a first fluidic amplifying means arranged to amplify any such error to produce a control pressure, said fluidic sensing means including a reference pressure and a control pressure, both of said pressures acting as control pressures for the first fluidic amplifying means and wherein said control pressure is obtained from a jet collector which is supplied with both of said inlet and outlet pressures in the form of variable pressures, the output pressure from the jet collector passing through a fixed orifice, said first fluidic amplifying means having a variable feedback of the control pressure to the sensing means, the variation of the feedback pressure being dependent on the values of the variables, a second fluidic amplifying means having a variable power supply pressure dependent on one of said variables, an output pressure arranged to vary a control system upon which the values of the variables depends and a control signal which is the control signal generated by the first fluidic amplifying means, the second fluidic amplifying means being capable of operation in two modes, one in which the power supply pressure is greater than the control pressure and the output pressure is a function of the power supply pressure and the other in which the control pressure is greater than the power supply pressure and the output pressure is a function of the control pressure.

10. A circuit as claimed in claim 9 in which the feedback pressure is connected to the control pressure generated by the jet collector downstream of the fixed area orifice.

11. A fluid control circuit in a gas turbine having a compressor for controlling the ratio between inlet and outlet pressure of the compressor, both of said pressures being variable, the circuit comprising a fluidic sensing means for detecting any error in said ratio, a first fluidic amplifying means arranged to amplify any such error to produce a control pressure, said fluidic sensing means including a reference pressure and a control pressure both of said pressures acting as control pressures for the first fluidic amplifying means, said reference pressure being obtained from a splitter, one of said variable pressures being supplied to one side of the splitter in the form of a variable pressure and arranged to pass through a first manually controlled variable area orifice, the other side of the splitter being vented to ambient pressure through a second variable area orifice, wherein the splitter includes a further variable area orifice in parallel with the first manually controlled variable area orifice and wherein a further solenoid operated orifice is located in parallel with said further variable area orifice and in communication with the reference pressure, the first fluidic amplifying means having a variable feedback of the control pressure to the sensing means, the variation of the feedback pressure being dependent on the values of the variables, a second fluidic amplifying means having a variable power supply pressure dependent on one of said variables, an output pressure arranged to vary a control system upon which the values of the variables depend and a control signal which is the control signal generated by the first fluidic amplifying means, the second fluidic amplifying means being capable of operation in two modes, one in which the power supply pressure is greater than the control pressure and the output pressure is a function of the power supply pressure and the other in which the control pressure is greater than the power supply pressure and the output pressure is a function of the control pressure.

* * * * *